United States Patent [19]

Takata

[11] Patent Number: 5,226,501
[45] Date of Patent: Jul. 13, 1993

[54] ELECTRIC-MOTORED BICYCLE

[75] Inventor: Nozomu Takata, Iwata, Japan

[73] Assignee: Yamaha Hatsudoki Kabushik Kaisha, Iwata, Japan

[21] Appl. No.: 893,530

[22] Filed: Jun. 4, 1992

[30] Foreign Application Priority Data

Jun. 4, 1991 [JP] Japan .................. 3-159425
Jun. 4, 1991 [JP] Japan .................. 3-159430

[51] Int. Cl.$^5$ .................. B62K 7/02; B62M 23/02
[52] U.S. Cl. .................. 180/206; 180/220; 180/205; 180/19.1; 280/214; 318/139; 318/452
[58] Field of Search ............ 180/65.1, 65.2, 65.6, 180/205, 206, 219, 220, 19.1, 19.2, 193; 280/212, 214; 318/139, 445, 449, 452, 461, 466

[56] References Cited

U.S. PATENT DOCUMENTS

| | | | |
|---|---|---|---|
| 3,991,843 | 11/1976 | Davidson | 280/214 X |
| 4,122,907 | 10/1978 | Davidson et al. | 280/214 X |
| 4,168,758 | 9/1979 | Holt | 280/214 X |
| 4,364,448 | 12/1982 | Ikuma | 180/206 |
| 4,869,332 | 9/1989 | Fujita et al. | 180/219 X |
| 4,923,028 | 5/1990 | Yamashita et al. | 180/219 |
| 5,024,113 | 6/1991 | Ito et al. | 180/219 X |
| 5,024,286 | 6/1991 | Lean et al. | 180/206 |
| 5,078,227 | 1/1992 | Becker | 280/212 X |

FOREIGN PATENT DOCUMENTS

| | | | |
|---|---|---|---|
| 0168905 | 1/1986 | European Pat. Off. | 180/206 |
| 2403727 | 8/1975 | Fed. Rep. of Germany | 180/206 |
| 2411302 | 8/1979 | France | 280/214 |
| 57-74285 | 5/1982 | Japan . | |
| 0274491 | 3/1990 | Japan . | |

Primary Examiner—Brian Johnson
Attorney, Agent, or Firm—Ernest A. Beutler

[57] ABSTRACT

Several embodiments of electric power assisted bicycles wherein an electrical motor is employed for assisting in the pedaling of the bicycle. The embodiments all include an arrangement for changing the state of the electrical power in response to pushing of the bicycle. In some embodiments, the circuit for the electric motor is opened when the bicycle is pushed rearwardly so as to avoid undue resistance to the pushing as might occur due to the fact that the motor would operate as a generator under this condition and provide an electrical load. In other embodiments, the electric motor is energized upon pushing so as to assist in pushing the bicycle.

20 Claims, 6 Drawing Sheets

ELECTRIC-MOTORED BICYCLE

BACKGROUND OF THE INVENTION

This invention relates to an electric-motored bicycle and more particularly, a bicycle that is provided with an auxiliary electrical power plant.

Bicycles have been proposed that incorporate electrical motors powered by rechargeable batteries for providing operator assist under certain conditions. This type of bicycle generally includes a conventional pedal operated mechanism for manual powering of the bicycle. However, an electrical motor is incorporated for adding driving assist during periods when the operator is required to output considerable energy, such as when pedaling at high speed or up steep inclines. Generally this type of mechanism includes a torque responsive switch in the pedal operated mechanism which initiates operation of the electrical motor for assist when needed.

Although such arrangements are particularly useful, they also have some disadvantages. That is, the prior art type of constructions have certain operating modes when the electrical motor interface with the driven wheel can be improved. These situations arise primarily when the rider is not riding the bicycle but is attempting to push it.

It is, therefore, a principal object of this invention to provide an improved bicycle powered both manually and electrically and wherein the electrical control for the motor is varied in response to a condition of being pushed.

For example, it is generally the practice to couple both the electrical motor and the pedal mechanism to the driven wheel through individual one-way clutches. This is done so as to ensure that each driving mode need not override or drive the other. In addition, it is generally the practice to provide in the control circuit for the electric motor a device frequently referred to as a "flywheel diode." The purpose of the flywheel diode is to provide a flow circuit for the electrical power during the time when an inductive component is generated within the motor when the motor current is cut off. As a result of this arrangement, when an operator tries to push the bicycle rearwardly, the electrical motor, which normally includes a permanent magnet and winding, will generate a reverse electrical voltage which passes through the flywheel diode circuit. As a result, there is an electrical load generated which makes it more difficult for the rider to push the bicycle in a rearward direction.

It is, therefore, a principal object of this invention to provide an arrangement for an electrically assisted bicycle to facilitate pushing of the bicycle in reverse without generating an electrical load in the motor that tends to resist this rearward pushing action.

In addition to the aforenoted problems with the prior art type of construction when the bicycle is being pushed rearwardly, the power assist, as aforenoted, is generally operative only in response to operator input to the pedals. Thus, if the operator is pushing the bicycle in a forward direction, there will be no electrical motor assist. However, there may be times when it is desirable to have the electric motor assist the operator in pushing the bicycle, for example, uphill.

It is, therefore, a further principal object of this invention to provide an improved electrically powered bicycle wherein the electric power may be employed by the operator when desired to assist in pushing the bicycle.

SUMMARY OF THE INVENTION

This invention is adapted to be embodied in a wheeled vehicle having at least one driven wheel and occupant driven means drivingly coupled to the wheel for driving the wheel under manual power. An electrical motor is also incorporated for selectively driving the driven wheel. Control means are incorporated for operating the electrical motor in response to operator demand. In accordance with the invention, means are provided for changing the state of the control means in response to an attempt to push the vehicle.

In accordance with one feature of the invention, the means for changing the state of the control means opens the circuit to the electrical motor when the vehicle is being pushed in reverse so that the motor will not generate an electrical load resisting such rearward pushing.

In accordance with another feature of the invention, the means for changing the state of the control means in response to an attempt to push the vehicle operates the control means to provide electrical power assist when the vehicle is being pushed in a forward direction and under operator request.

DETAILED DESCRIPTION OF THE PREFERRED EMBODIMENTS OF THE INVENTION

Figure 1:
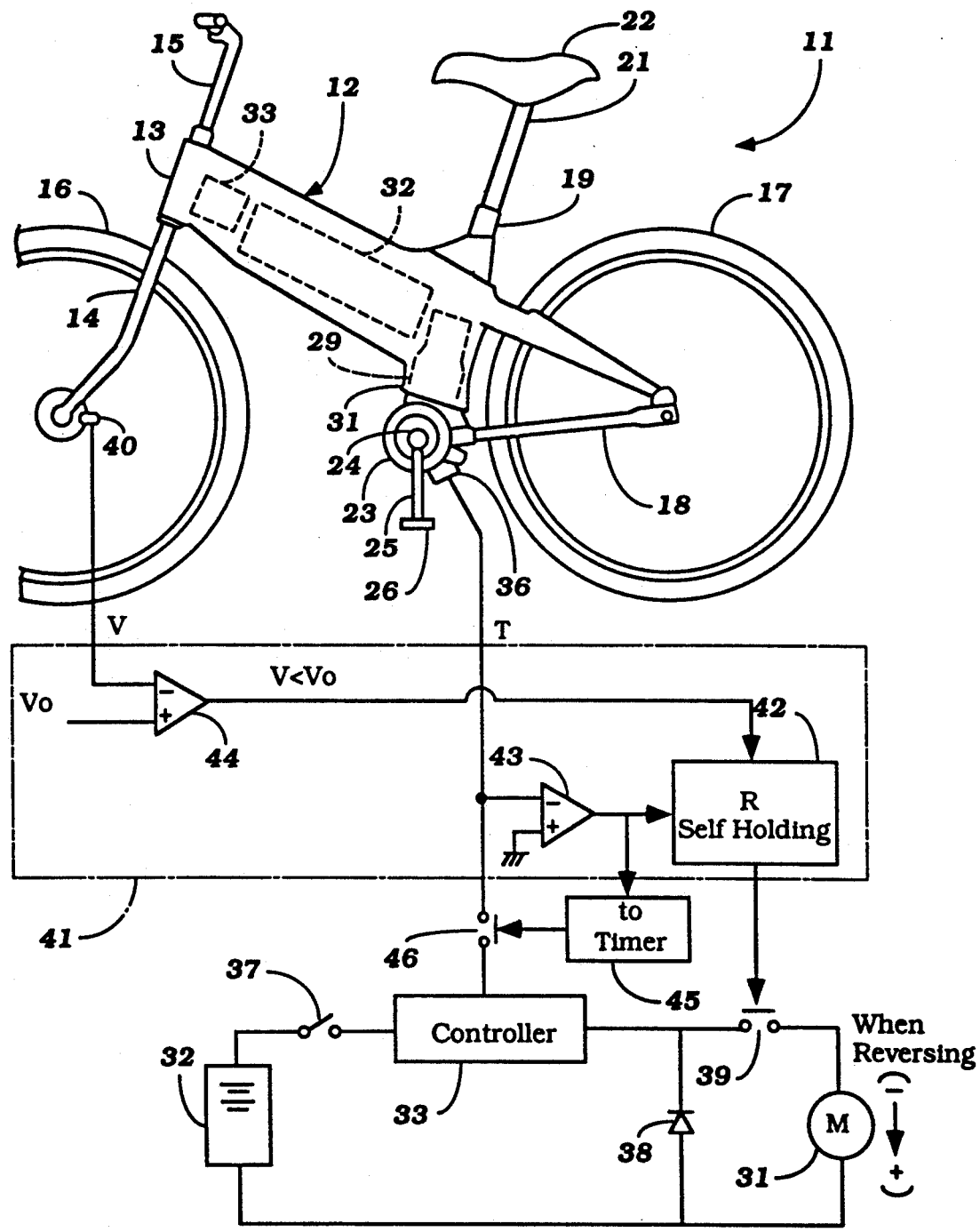
FIG. 1 is a side elevational view of an electric-motored bicycle constructed in accordance with an embodiment of the invention, with the reverse release system being shown in schematic form.

Referring first in detail to FIG. 1, a bicycle constructed in accordance with an embodiment of the invention is shown partially schematically and is identified generally by the reference numeral 11. The bicycle 11 includes a frame assembly, indicated generally by the reference numeral 12 having a head tube 13 which journals a front fork 14 for dirigible motion under the control of a handlebar 15. A front wheel 16 is rotatably journaled by the front fork 14 in a known manner. A rear wheel 17 is journaled at the rear of the frame assembly 12 by means including a pair of rear stays 18 which extend on opposite sides of the rear wheel 17. The rear wheel 17 is driven in a manner which will be described.

A seat tube 19 slidably supports a seat post 21 on which a saddle type seat 22 is positioned so as to accommodate a rider. Beneath the seat tube 19 is provided a bottom bracket 23 upon which a crankshaft 24 is rotatably journaled in a known manner. A pair of crank arms 25 are affixed to opposite ends of the crankshaft 24 and carry pedals 26 so as to permit the pedaling of the bicycle 11 by an operator seated upon the seat 22.

Figure 3:
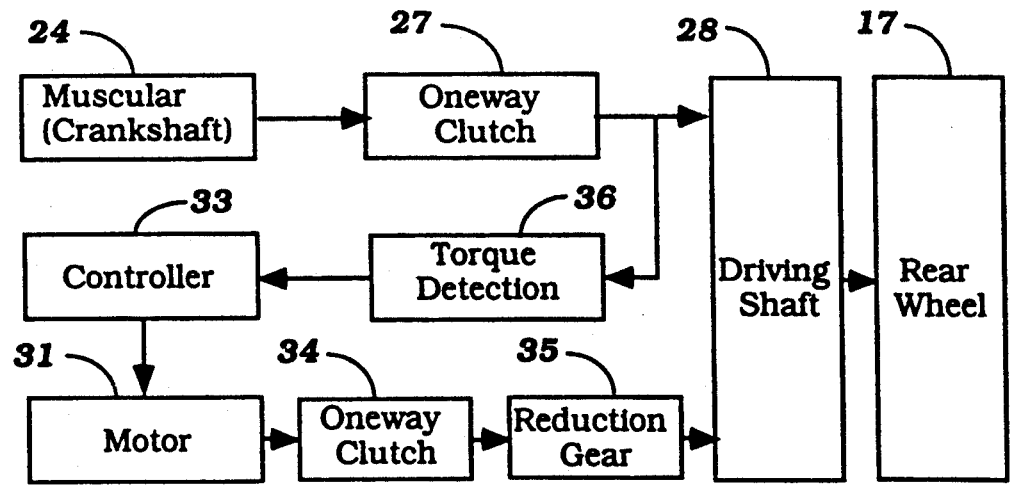
FIG. 3 is a block diagram showing the components of the system.

Referring additionally to FIG. 3, the crankshaft 24 is coupled through a one-way clutch shown schematically at 27 in FIG. 3 to a driving shaft 28 which passes through one of the side stays 18 and drives the rear wheel 17 through a suitable pinion and ring gear driving arrangement.

Continuing to refer to FIGS. 1 and 3, the bottom portion of the seat tube 19 is formed with a motor bracket 29 in which an electrical motor 31 is positioned. The electrical motor 31 is powered by a rechargeable electrical battery 32 carried in the frame assembly 12 and which powers the motor 31 through a controller 33. Like the crankshaft 24, the output shaft of the electrical motor 31 is connected to the driving shaft 28 through a one-way clutch 34, shown schematically in FIG. 3. The one-way clutch 34 drives the driving shaft 28 through a planetary gear transmission 35 which is also coupled into the connection of the one-way clutch 27 that connects the crankshaft 24 to the driving shaft 28. In this planetary gear reduction set 35 there is provided a torque sensing switch 36 which outputs a signal back to the controller 33 so as to energize the electrical motor 31 during times when the driving load is high, either due to the fact that the operator is exerting greater pressure on the pedals 26 or needs to exert a greater force due to pedaling uphill.

The circuit by which the motor 31 is controlled is shown schematically in FIG. 1 and in addition to the battery 32, controller 33 and motor 31 includes a main switch 37 which must be closed in order to energize the system. In addition, the circuit includes a flywheel diode 38 so as to accommodate the condition when the bicycle is coasting and the controller 33 shuts off the flow of electricity to the motor 31. The diode 38 accommodates the inductive component of the current, as is well known.

As has been previously noted, the motor 31 may be of the type embodying a permanent magnet stator and a rotating motor coil. The controller 33 controls the power supply to the motor 31 in a suitable manner, such as a chopper method, a voltage switching method, etc.

If the operator is not pedaling the bicycle 11 and wishes to push it in a reverse direction, the one-way clutches 27 and 34 will cause both the pedals to rotate in a reverse direction and the motor 31 to rotate in a reverse direction. When this occurs, the motor 31 will act as a generator, generating a voltage having a polarity as shown in FIG. 1. When this occurs, a current flow will occur through the flywheel diode 38 so as to place an electrical load on the system which will resist the operator's pushing the bicycle 11 in reverse. The system also incorporates an arrangement for opening the circuit between the motor 31 and the diode 38 under reverse pushing conditions so as to relieve the operator from this reverse pushing load.

This system includes a normally opened switch 39 in the circuit between the motor 31 and the diode 38 on the controller's side. The normally open switch 39 is adapted to be controlled by a reverse control circuit, indicated by the block 41 and which includes a self-holding circuit 42 which, when energized in a manner to be described, will close the switch 39 and permit normal operation of the motor 31.

The self-holding circuit 42 is initiated by means of a torque comparator 43 that receives a torque signal T from the torque sensor 36 and compares it with a fixed value. This fixed value may be a zero so that if the torque T is greater than zero the self-holding circuit 42 will be initiated and held on until reset so as to close the switch 39 until reset. Thus, once the switch 39 is closed, the motor circuit connecting the motor 31 with the battery 32 will remain closed even if pedaling torque is discontinued.

The self-holding circuit 42 is reset when the speed of the bicycle 11 falls below a predetermined speed. Generally this speed is actually a condition of stopping of the bicycle 11. This is accomplished by means of a speed comparator 44 which receives a speed signal from a bicycle speed sensor 40 which may be associated with either the front wheel 16 as illustrated or the rear wheel 17. The comparator 44 compares the speed from the sensor 40 V with a fixed reference speed $V_o$ and if the bicycle speed is less than the reference speed $V_o$, the self-holding circuit 42 is reset and the switch 39 is opened so that motor control of the electric motor 31 is no longer possible.

Figure 2:
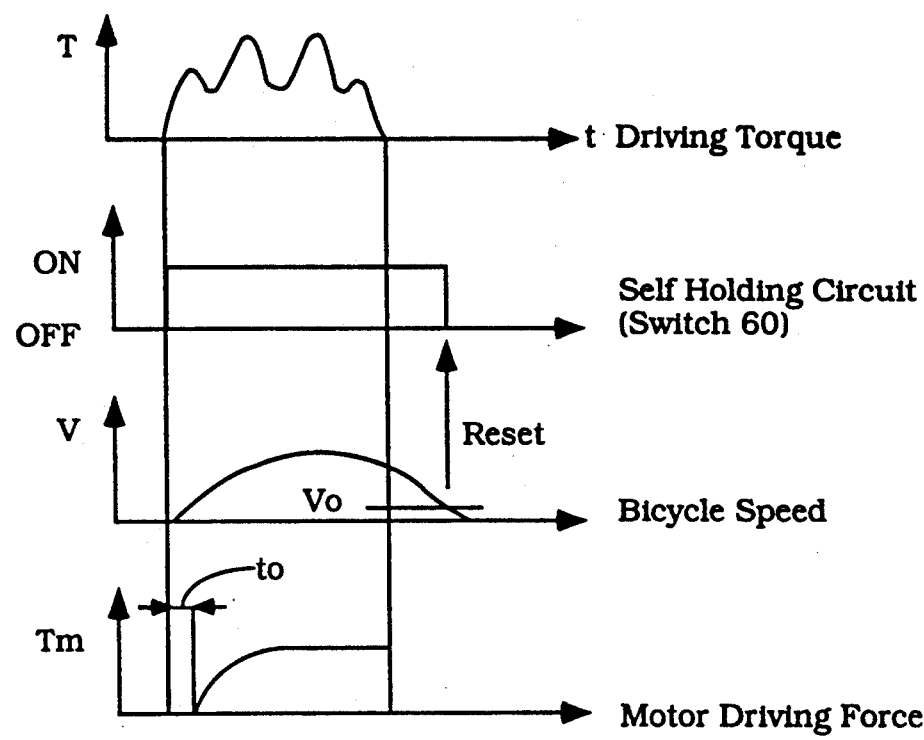
FIG. 2 is a graphical view showing certain conditions to explain how the reverse release condition is operated.

In some instances it may be desirable to ensure that the controller 33 will not immediately reactivate the motor 31 once the operator again applies a sufficient torque to the pedals 26. Therefore, the system also incorporates a timer 45 that will close a normally opened switch 46 between the torque sensor 36 and the controller 33 after a predetermined time period has elapsed when the comparator 43 indicates that a driving torque has been exerted that necessitates operation of the motor 31. The effect of this timer may be seen in FIG. 2.

Thus, it may be readily apparent from the description of this embodiment that the device is effective to ensure that power from the electric motor 31 will be available when desired but also that the operator need not push the bicycle rearwardly against the force generated by the motor 31 if it operates as a generator when being pushed rearwardly.

Figure 4:
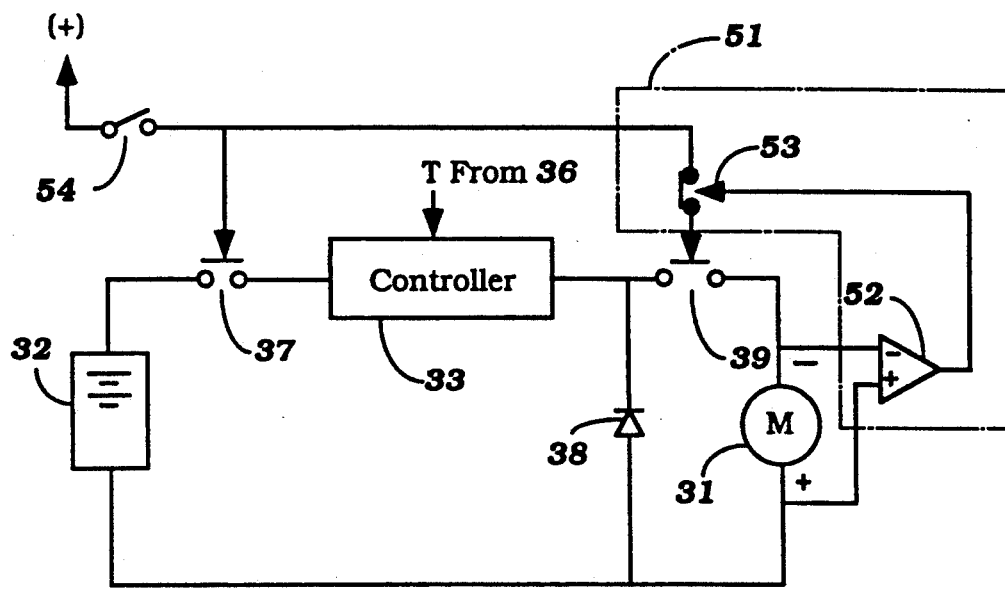
FIG. 4 is a schematic view showing another type of reverse release mechanism.

FIG. 4 shows another type of control arrangement which will achieve the same general result. In this Figure, components which are the same as those previously described have been identified by the same reference numerals. In this embodiment, the reverse control switch 39 is controlled by a reverse control circuit, indicated generally by the reference numeral 51 and which includes a comparator 52 for sensing the polarity condition of the motor 31. When the comparator 52 senses that the motor 31 is being driven in a reverse direction and hence is operating as a generator, the comparator will output a signal to open a switch 53 in a circuit between a key switch 54 and the reverse switch 39, so as to effect opening of the switch 39. The key switch 54 operates in this embodiment to also control the main switch 37.

Figure 5:
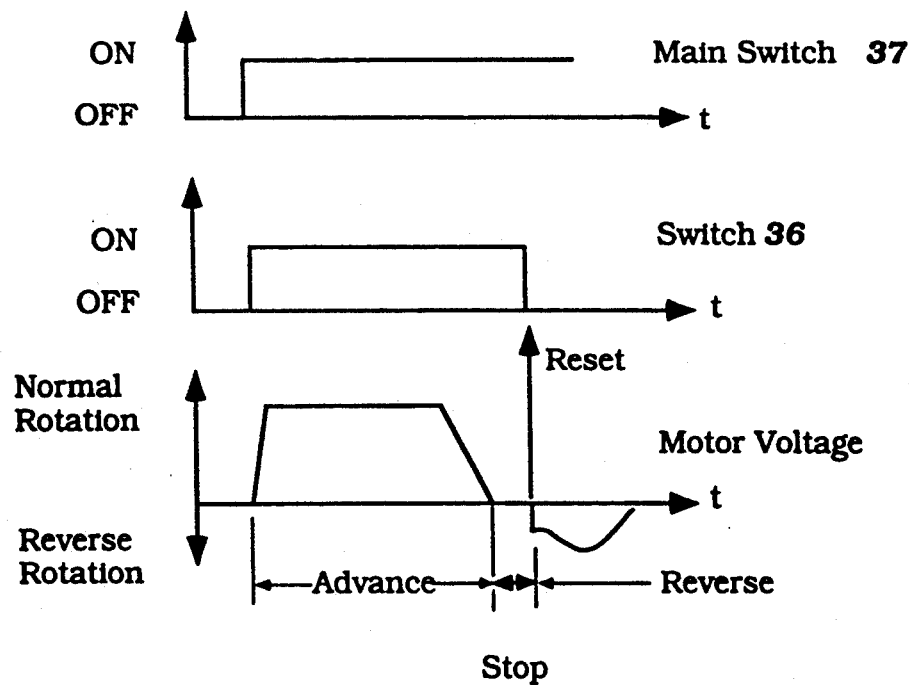
FIG. 5 is a graphical view showing the conditions in this embodiment.

This embodiment operates as shown in FIG. 5 so that when the main switch 37 is activated by closing the key switch 54, the switch 39 will be closed and motor control of the motor 31 is possible when the torque switch 36 indicates a demand. However, if the bicycle 11 is pushed in reverse, the comparator 52 will sense this reverse rotation and output a signal to open the normally closed switch 53 which, in turn, will effect opening of the reverse switch 39 and prevent any reverse loading to be generated due to the completion of a circuit through the diode 38.

In addition to ensuring against the necessity of pushing the bicycle 11 rearwardly against a force generated by the motor 31 when operating in reverse and acting as a generator, it may also be desirable to provide an arrangement wherein the electric motor 31 may be used as an assist when pushing the bicycle 11. As has been previously noted, the motor 31 is not operated unless the operator exerts sufficient pedaling force so that the torque sensor 36 indicates the exertion of a predetermined pedaling force on the bicycle.

Figure 6:
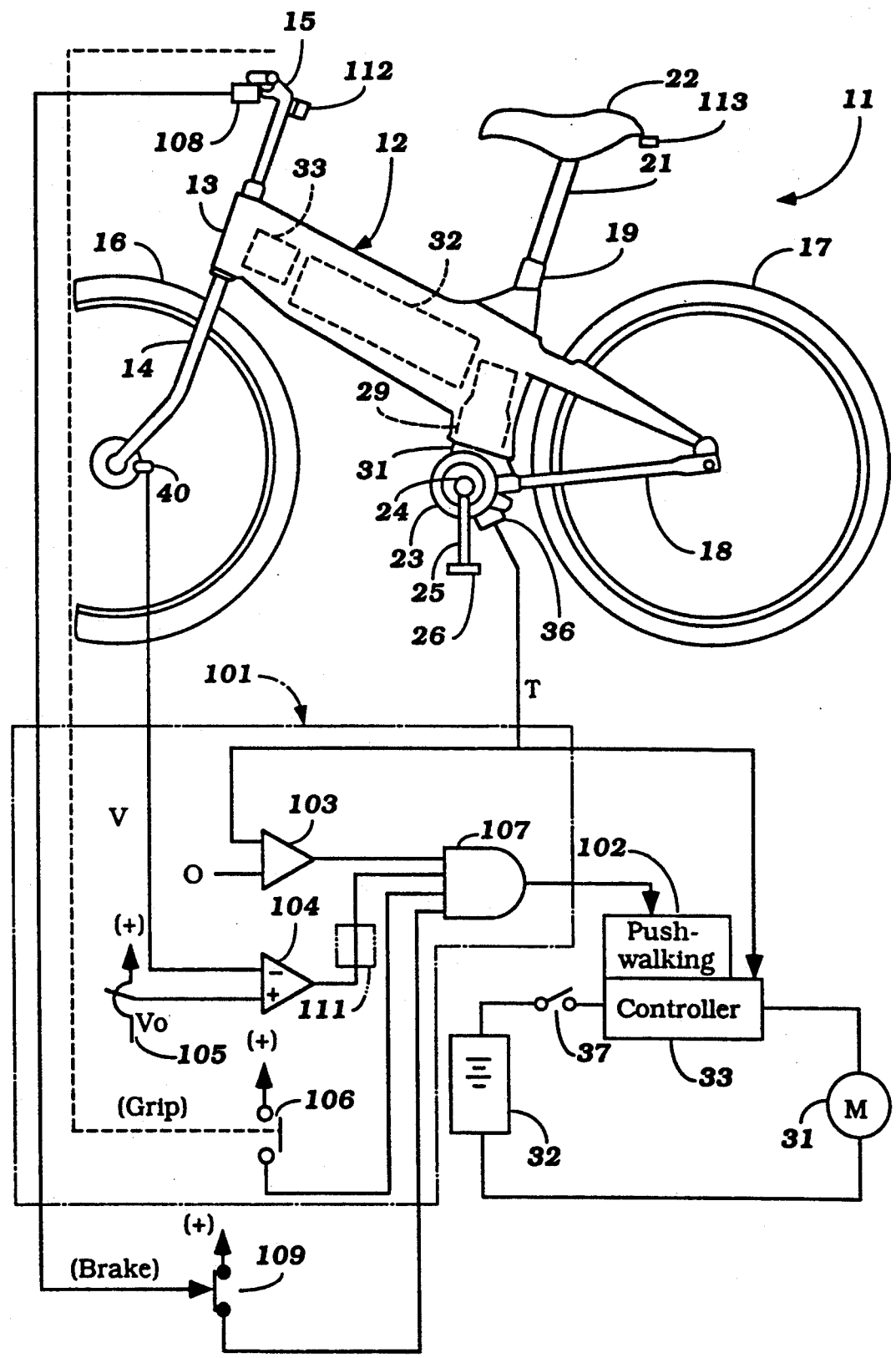
FIG. 6 is a view in part similar to FIG. 1 and shows schematically the push/walking control system schematically.
Figure 7:
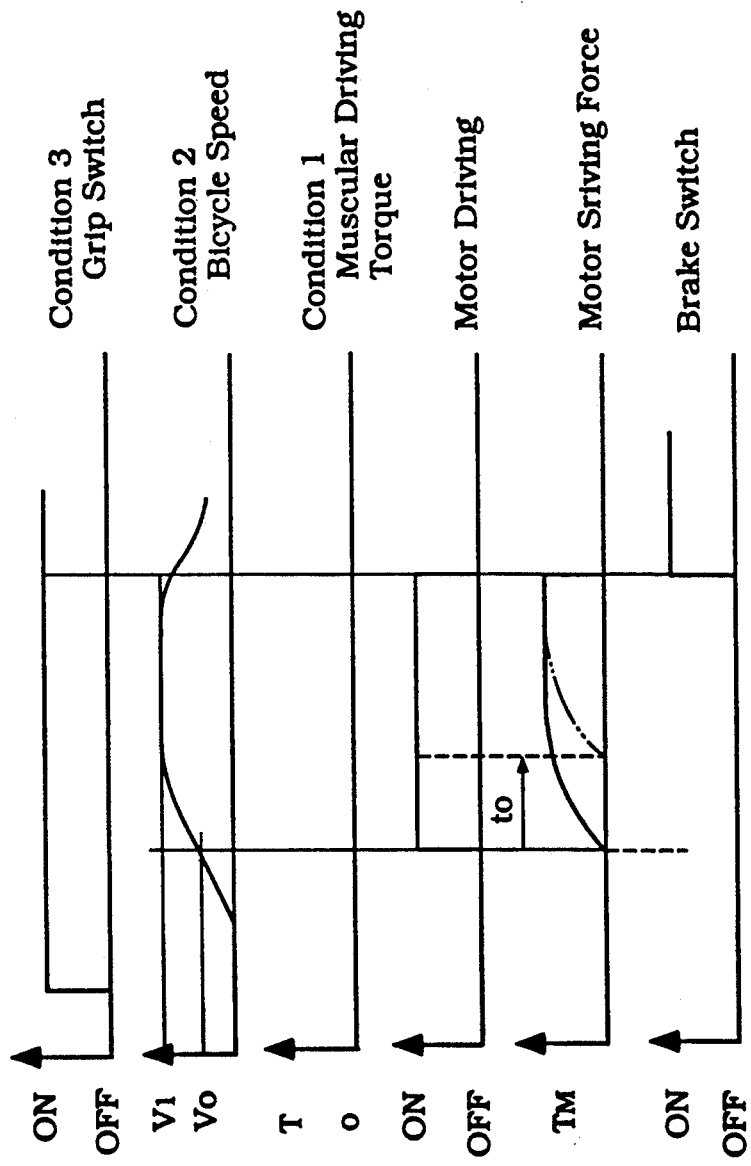
FIG. 7 is a graphical view showing the conditions during the push/walking mode.

FIGS. 6 and 7 show another embodiment of the invention wherein such pushing assist may be achieved from the motor 31. This may be accomplished either with or without the reverse release as described in conjunction with the embodiments of FIGS. 1-3 or 4 and 5. However, the basic control for the motor 31 and driving relationship previously described is also incorporated in this embodiment and for that reason that portion of the bicycle 11 and its controls will not be described again, except insofar as is necessary to understand the construction and operation of this embodiment.

In this embodiment, there is provided a discriminator circuit 101 for determining when a push/walking condition is present. When this condition is sensed, in a manner as will be described, the circuit 41 outputs a control signal to a push/walking control circuit 102 that cooperates with the control circuit 33 so as to energize the motor 31. The push/walking control circuit 102, however, controls the maximum output of power to the motor 31 so as to reduce the power from that during normal pedaling so as to limit the maximum push/walking speed achieved by the motor 31 to something in the range of about two to three kilometers/hour (something slightly slower than normal walking speed). As may be seen in FIG. 7, this limits the motor driving force to an amount $T_M$.

In this embodiment of the invention, the push/walking mode is sensed when three conditions exist. These three conditions are the exertion of zero pedaling torque by a torque comparator 103 which compares the torque T from the torque sensor 36 with a preset low value such as zero. In addition, the speed sensor 45 outputs its signal to a speed comparator 104 which determines that the speed of the bicycle 11 is at a low speed such as a speed slightly less than walking speed as set by a variable resistor 105. Furthermore, a condition wherein the rider is pushing the bicycle is sensed, for example, by a hand grip sensor which operates a switch 106. An And All circuit 107 receives the output from the torque comparator 103, speed comparator 104 and hand grip switch 106 and when all of these signals are outputted, then the and circuit 107 energizes the push/walking circuit 102 to provide push/walking power to the electric motor 31 for walking assist.

In order to override the push/walking operation, the operator can merely exert pressure on the brake control 108, normally carried by the handlebar 15, and open a normally closed switch 109 to turn the and circuit 101 off regardless of the condition of the comparators 103 and 104 and the hand grip switch 106. Hence, once the brake is energized and the brake switch 108 indicates this, the push/walking operation of the motor 31 will be discontinued.

If desired, an arrangement may be incorporated so as to ensure that the push/walking operation of the motor 31 does not initiate automatically upon sensing of all three of the conditions (torque, speed and hand grip) and to achieve this a timer, indicated in phantom and identified generally by the reference numeral 111 may be provided, for example, in, the circuit connecting the speed comparator 104 with the AND ALL circuit 107. Of course, this timer can be placed in any of the other circuits such as between the comparator 103 and the and circuit 107 or the hand grip 106 and the and circuit 107. In addition, the timer may be positioned in the output circuit from the And All circuit 107 and the push/walking control circuit 102.

The system may also incorporate a manually operated switch wherein the operator may control the push/walking control circuit 102 independently of the existence of the other conditions. The operator may wish to do this when, for example, pushing up a hill and a manually operated switch 112 may be positioned on the handlebar assembly 15 or a manually operated switch 113 may be positioned at the rear of the seat 22. The manually operated switch may, of course, be located in any other position.

Figure 8:
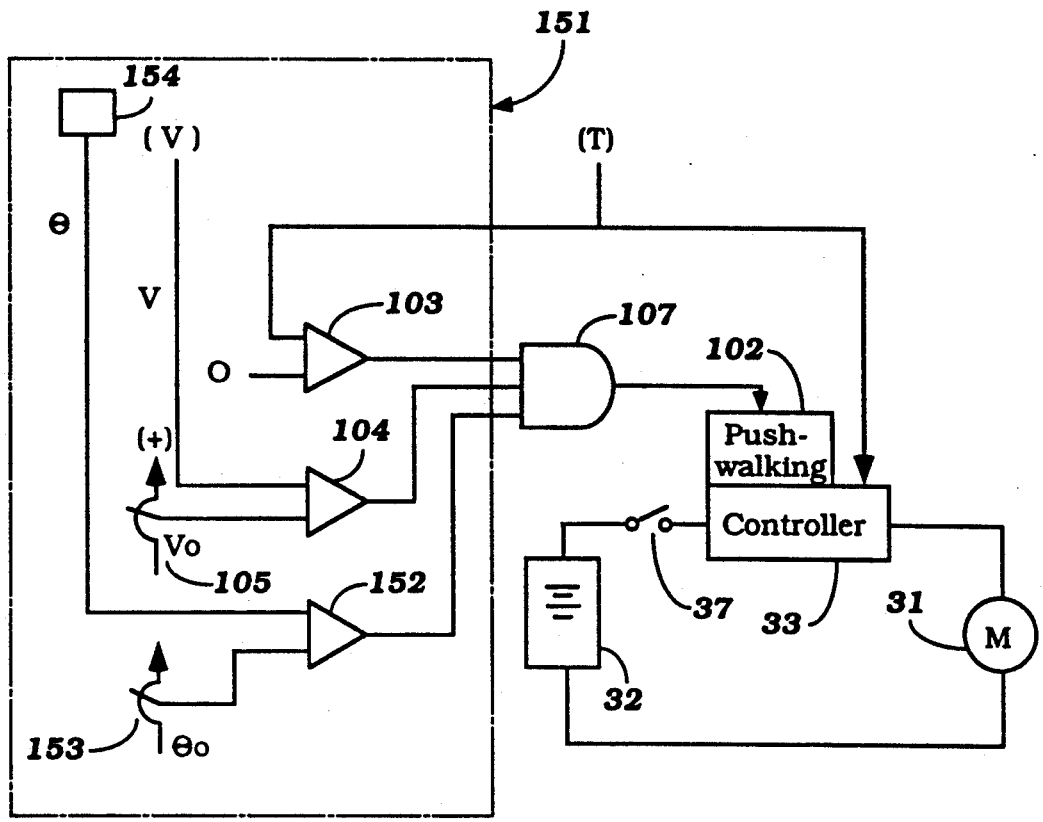
FIG. 8 is a schematic view showing another embodiment of push/walking arrangement.
Figure 9:
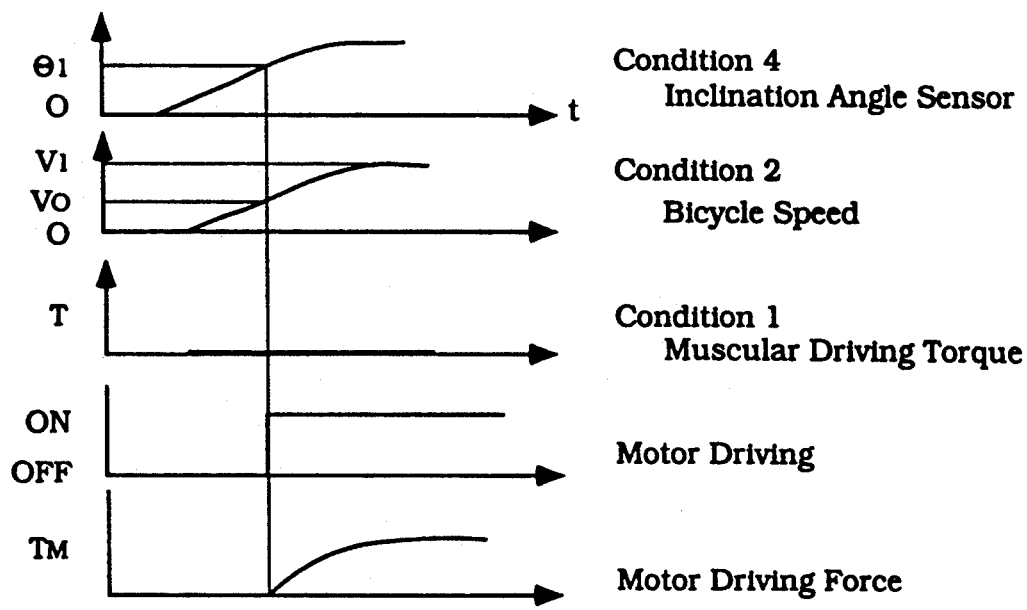
FIG. 9 is a graphical view explaining the push/walking operation of the embodiment of FIG. 8.

Rather than employing the hand grip switch 106 as an indication of the need for electrical power assist during pushing, it may also be possible to sense the need for power assist during pushing in other manners. FIGS. 8 and 9 show such a further embodiment of the way in which this can be accomplished wherein the push/walking discriminating circuit is indicated generally by the reference numeral 151. This embodiment, like the embodiment of FIGS. 6 and 7 also uses the torque sensor comparator 103 and the speed sensor comparator 104. However, the hand grip switch 106 is replaced by a comparator 152 which senses when the angle of incline upon which the bicycle 11 is being pushed is greater than a predetermined angle $\theta_o$ as set by a variable resistor 153.

In this embodiment, an inclinometer 154 is incorporated that outputs a signal equivalent to the angle of incline $\theta$ upon which the bicycle is being pushed. If this angle is greater than the angle $\theta_o$, then the comparator 152 outputs a signal to the And All circuit 107 and if the comparators 103 and 104 have also outputted signals, then the push/walking circuit 102 is energized. Of course, this embodiment can also employ a release type mechanism such as the brake switch of the previously described embodiment.

It should be readily apparent from the foregoing description that the described embodiments of the invention are very effective in providing an electrically assisted bicycle in which the electric control can be altered in response to a pushing condition to release the load on the electric motor when it operates as a generator when being pushed in reverse and/or to provide electrical power assistance when the bicycle is not being ridden but wherein the bicycle is being pushed by hand. Although the invention has been described in conjunction with a bicycle, it should be readily apparent to those skilled in the art that this invention can be employed with various other types of self-propelled vehicles that are driven by pedal power such as tricycles or the like. Of course, the foregoing description is that of preferred embodiments of the invention and various changes and modifications may be made without departing from the spirit and scope of the invention, as defined by the appended claims.

I claim:

1. A wheeled vehicle having at least one driven wheel, occupant driving means drivingly connected to said driven wheel for driving said driven wheel under manual power, an electrical motor attached to said vehicle for selectively driving said driven wheel, control means for operating said electrical motor in response to operator demand, and means for sensing a pushing of said vehicle for changing a state of said control means in response to a pushing of said vehicle.

2. A wheeled vehicle as set forth in claim 1 wherein the occupant may ride the vehicle and drive the vehicle when ridden by the occupant or walk aside the vehicle and push the vehicle.

3. A wheeled vehicle as set forth in claim 2 wherein the occupant driving means comprises an interconnected pedal mechanism.

4. A wheeled vehicle as set forth in claim 3 wherein the control means for operating the electric motor is responsive to operator operation of the pedal mechanism.

5. A wheeled vehicle as set forth in claim 1 wherein the means for changing the state of the control means includes time delay means.

6. A wheeled vehicle as set forth in claim 5 wherein the time delay means delays the time when the control means returns to a state prior to the pushing of the vehicle.

7. A wheeled vehicle as set forth in claim 5 wherein the time delay means delays the time on which the state of the control means is changed.

8. A wheeled vehicle as set forth in claim 1 wherein the electric motor is driven in reverse when the vehicle is pushed backward and there is provided a circuit through which the generated electricity will pass and wherein the means for changing the state of the control means comprises a switch in said circuit opened in response to the reverse pushing of the vehicle.

9. A wheeled vehicle as set forth in claim 8 wherein the occupant may ride the vehicle and drive the vehicle when ridden by the occupant or walk aside the vehicle and push the vehicle.

10. A wheeled vehicle as set forth in claim 9 wherein the occupant driving means comprises an interconnected pedal mechanism.

11. A wheeled vehicle as set forth in claim 10 wherein the control means for operating the electric motor is responsive to operator operation of the pedal mechanism.

12. A wheeled vehicle as set forth in claim 8 wherein the means for changing the state of the control means includes time delay means.

13. A wheeled vehicle as set forth in claim 12 wherein the time delay mean delays the time when the control means returns to a state prior to the pushing of the vehicle.

14. A wheeled vehicle as set forth in claim 1 wherein the means for changing of the state of the control means is operative to initiate driving of the driven wheel by the electric motor upon pushing of the vehicle in a forward direction.

15. A wheeled vehicle as set forth in claim 14 wherein the occupant may ride the vehicle and drive the vehicle when ridden by the occupant or walk aside the vehicle and push the vehicle.

16. A wheeled vehicle as set forth in claim 15 wherein the occupant driving means comprises an interconnected pedal mechanism.

17. A wheeled vehicle as set forth in claim 16 wherein the control means for operating the electric motor is responsive to operator operation of the pedal mechanism.

18. A wheeled vehicle as set forth in claim 14 wherein the means for changing the state of the control means includes time delay means.

19. A wheeled vehicle as set forth in claim 18 wherein the time delay means delays the time on which the state of the control means is changed.

20. A wheeled vehicle as set forth in claim 19 wherein there are further provided means for permitting the operator to discontinue operation of the electrical motor upon desire when pushing the wheeled vehicle.

* * * * *